(12) United States Patent
Thurley

(10) Patent No.: US 8,438,971 B1
(45) Date of Patent: May 14, 2013

(54) STAND MIXER AND HEATING MEANS COMBINATION APPARATUS

(76) Inventor: Sally Thurley, Mournington (AU)

( * ) Notice: Subject to any disclaimer, the term of this patent is extended or adjusted under 35 U.S.C. 154(b) by 575 days.

(21) Appl. No.: 12/717,244

(22) Filed: Mar. 4, 2010

(51) Int. Cl.
*A47J 36/24* (2006.01)
*B01F 15/06* (2006.01)
*B01F 9/10* (2006.01)

(52) U.S. Cl.
USPC ............. 99/348; 366/146; 366/224; 366/251; 366/297; 366/301; 366/341; 366/343

(58) Field of Classification Search .................... 99/348, 99/287; 366/146, 220, 224, 251, 279, 281, 366/282, 297, 301, 341, 343; 219/201, 428, 219/443.1, 452.11, 468.1, 474
See application file for complete search history.

(56) References Cited

U.S. PATENT DOCUMENTS

| 1,227,935 | A | * | 5/1917 | Robertson ..................... 366/146 |
| 2,275,901 | A | * | 3/1942 | Harwood ...................... 219/201 |
| 2,648,514 | A | * | 8/1953 | Rosier et al. .................. 248/131 |
| 2,707,622 | A | * | 5/1955 | Vance ............................ 366/199 |
| 3,951,351 | A | | 4/1976 | Ernster et al. |
| 4,222,493 | A | * | 9/1980 | Friedman .......................... 220/8 |
| D265,166 | S | | 6/1982 | Ernest et al. |
| 4,706,558 | A | | 11/1987 | Snyder, Jr. |
| 5,441,169 | A | * | 8/1995 | Petty .......................... 220/573.4 |
| 5,524,530 | A | | 6/1996 | Nijzingh et al. |
| 5,834,739 | A | | 11/1998 | Lockwood et al. |
| 5,911,505 | A | | 6/1999 | St. John et al. |
| 6,629,491 | B1 | | 10/2003 | Chan |
| 2006/0044935 | A1 | * | 3/2006 | Benelli et al. ................. 366/145 |

FOREIGN PATENT DOCUMENTS

GB  2441508  12/2008

* cited by examiner

*Primary Examiner* — Benjamin Layno

(57) ABSTRACT

A stand mixer and heating means combination apparatus includes a stand mixer that has a base. A top side of the base includes a container mating member. An outer container includes a mixer mating member that is engageable with the container mating member. The outer container includes a bottom wall. A heating assembly is mounted on the base and is in thermal communication with the outer container. An inner container has a lower wall. The inner container has a size to be positioned in the outer container. A first mating member is attached to an outer surface of the inner container and is engageable with a second mating member attached to an inner surface of the outer container such that the lower and bottom walls are retained in a spaced relationship with each other.

5 Claims, 6 Drawing Sheets

STAND MIXER AND HEATING MEANS COMBINATION APPARATUS

BACKGROUND OF THE DISCLOSURE

Field of the Disclosure

The disclosure relates to heated stand mixer devices and more particularly pertains to a new heated stand mixer device for automatically mixing food while it is being heated.

SUMMARY OF THE DISCLOSURE

An embodiment of the disclosure meets the needs presented above by generally comprising a stand mixer that has a base, a post attached to and extending upwardly from the base, and a mixer housing pivotally coupled to the post opposite the base. Mixing attachments are attachable to the mixer housing and rotated by the mixer housing. A top side of the base includes a container mating member. An outer container has an outer surface having a mixer mating member that is releasably engageable with the container mating member. The outer container includes a bottom wall and a perimeter wall attached to and extending upwardly from the bottom wall. A heating assembly is mounted on the top side of the base and is spaced from post and below the mixer housing. The heating assembly is in thermal communication with the outer container when the mixer mating member is engaged with the container mating member. An inner container has a lower wall and a perimeter wall is attached to and extends upwardly from the lower wall. The inner container has a size to be positioned in the outer container. A first mating member is attached to an outer surface of the inner container and a second mating member is attached to an inner surface of the outer container. The first and second mating members are releasably engageable with each other to secure the outer and inner containers together while retaining the lower and bottom walls in a spaced relationship with each other.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
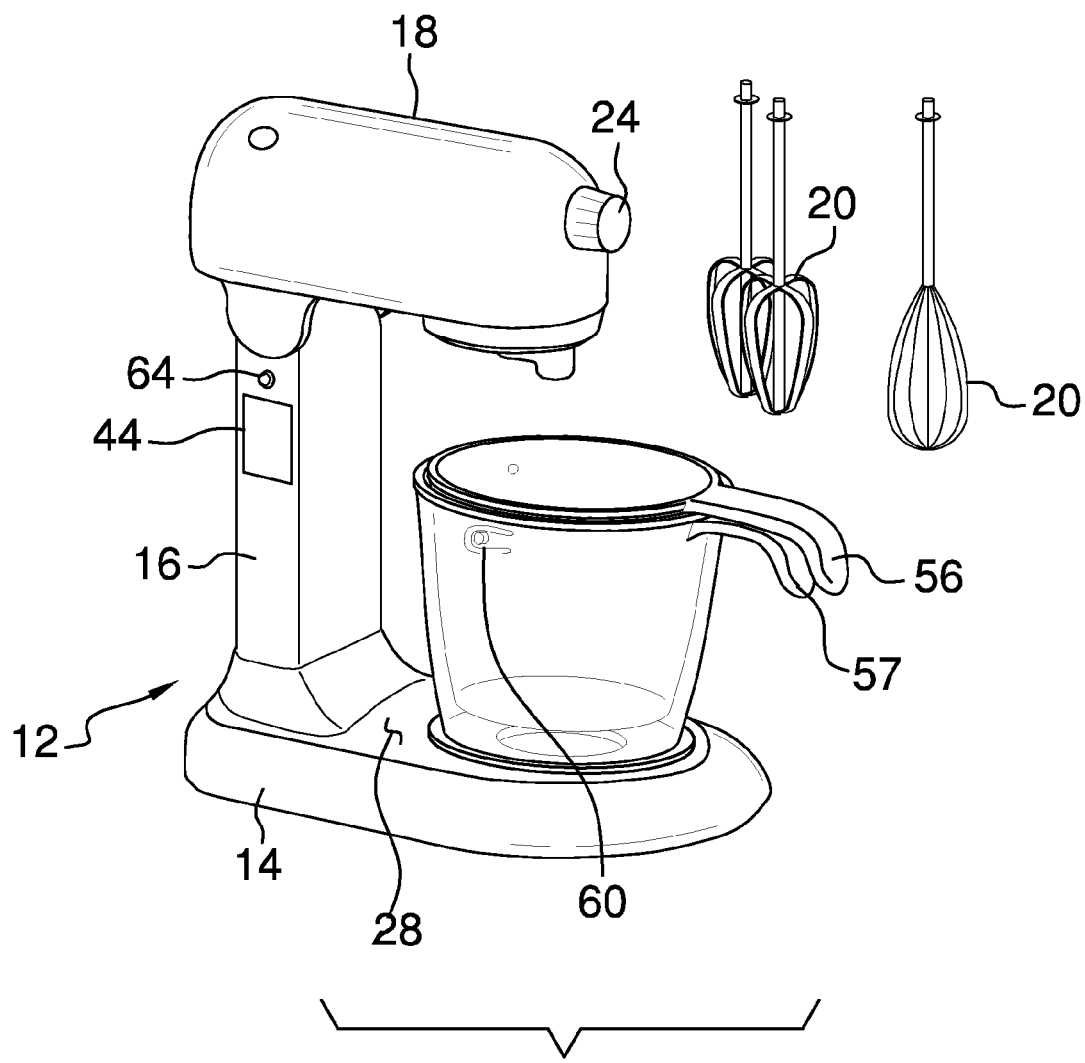
FIG. 1 is a perspective view of a stand mixer and heating means combination apparatus according to an embodiment of the disclosure.
Figure 2:
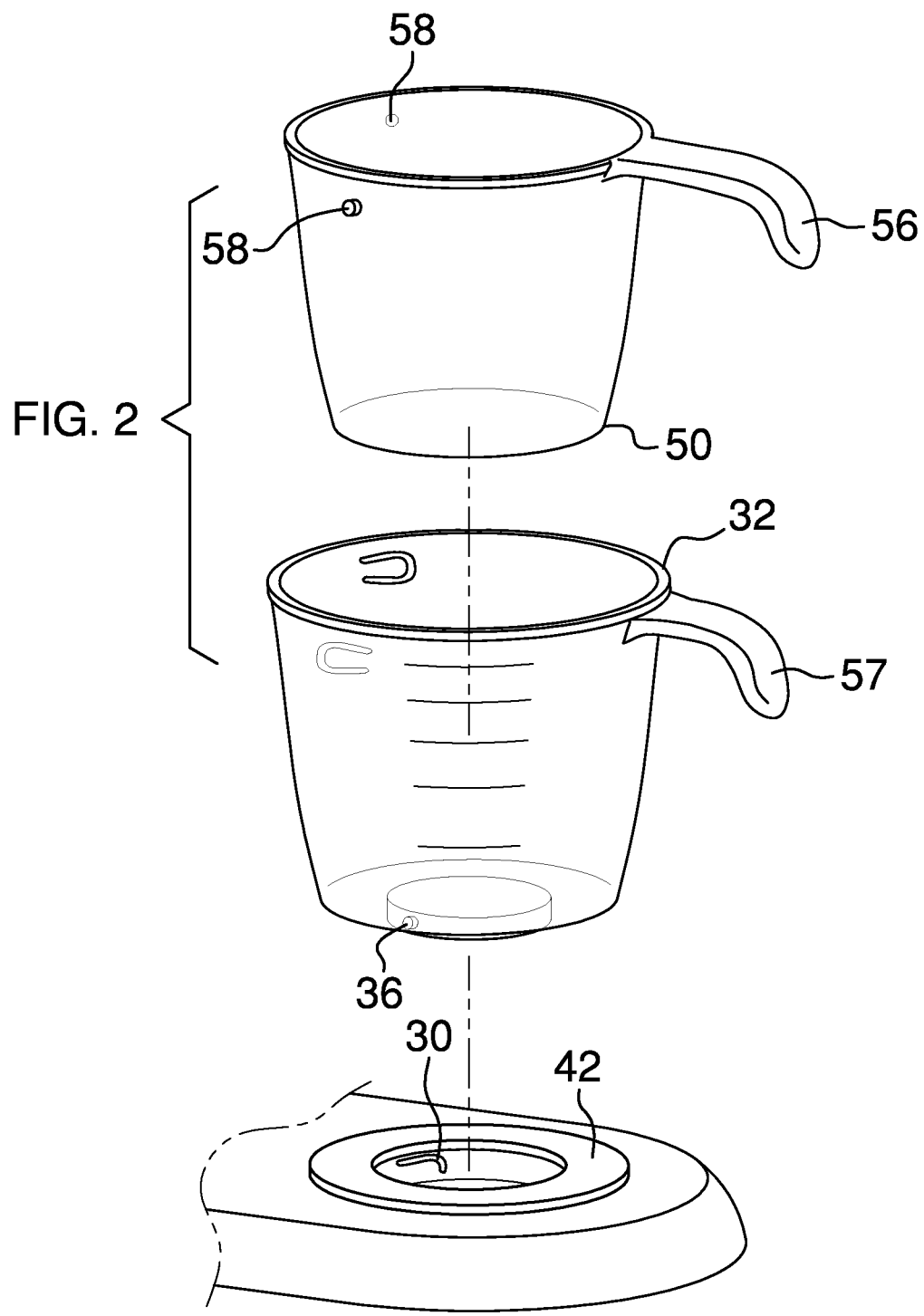
FIG. 2 is a perspective exploded view of an embodiment of the disclosure.
Figure 3:
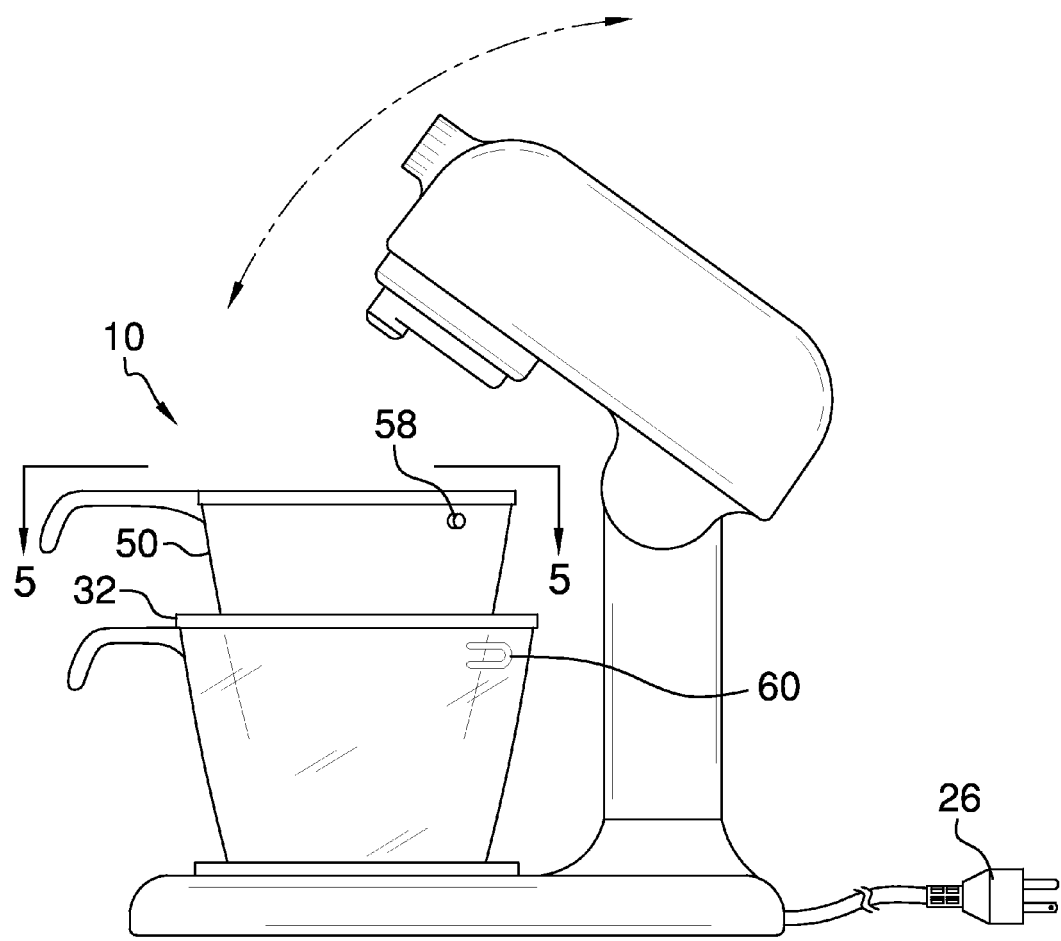
FIG. 3 is a side view of an embodiment of the disclosure.
Figure 4:
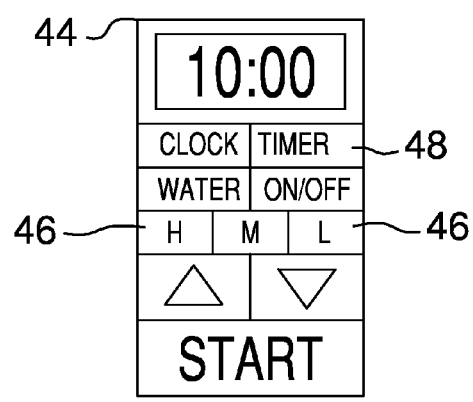
FIG. 4 is a front enlarged view of a control actuator an embodiment of the disclosure.
Figure 5:
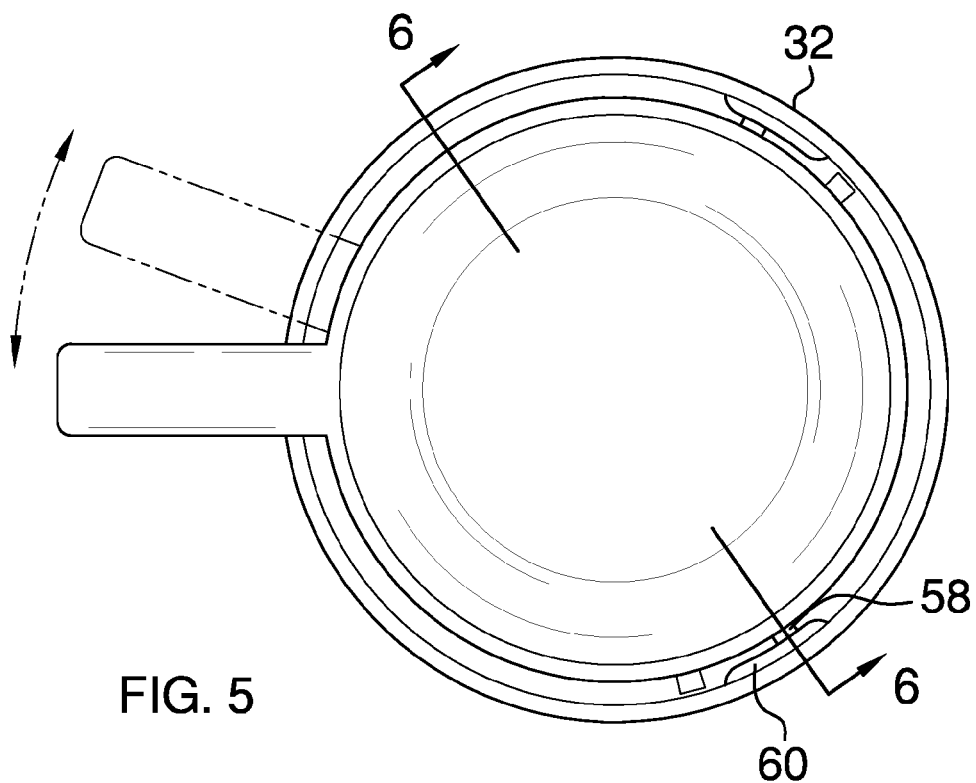
FIG. 5 is a top view of an embodiment of the disclosure.
Figure 6:
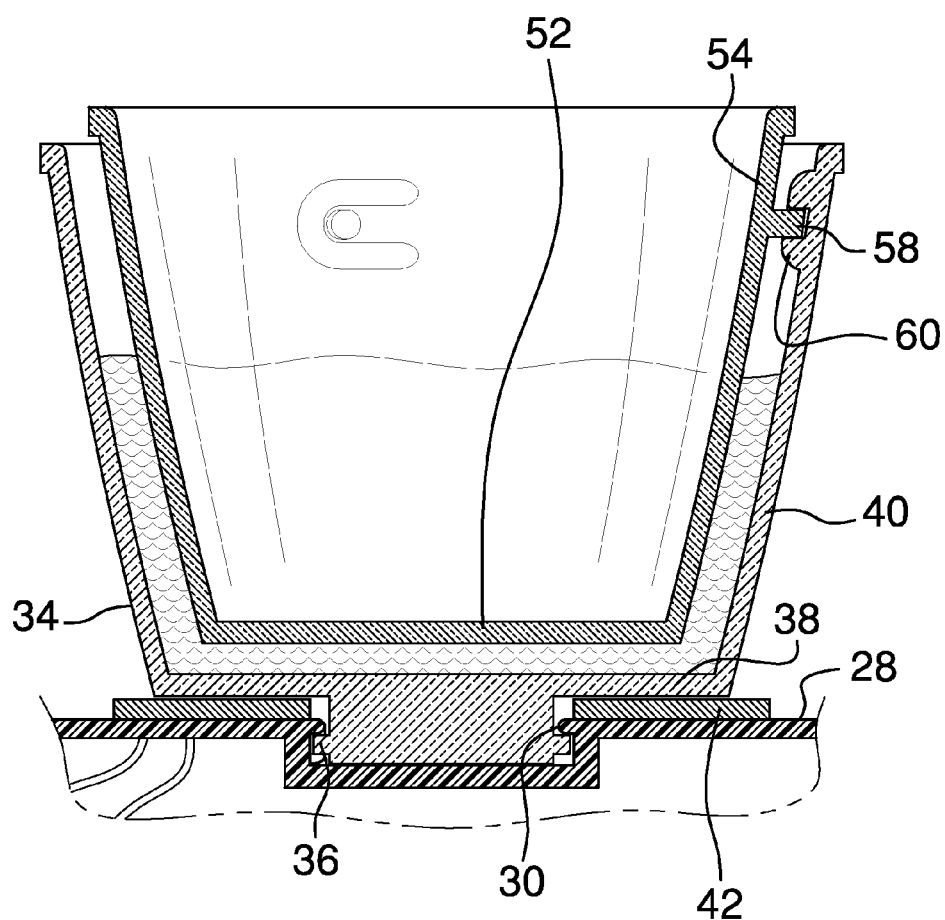
FIG. 6 is a cross-sectional view of an embodiment of the disclosure taken along line 6-6 of FIG. 5.
Figure 7:
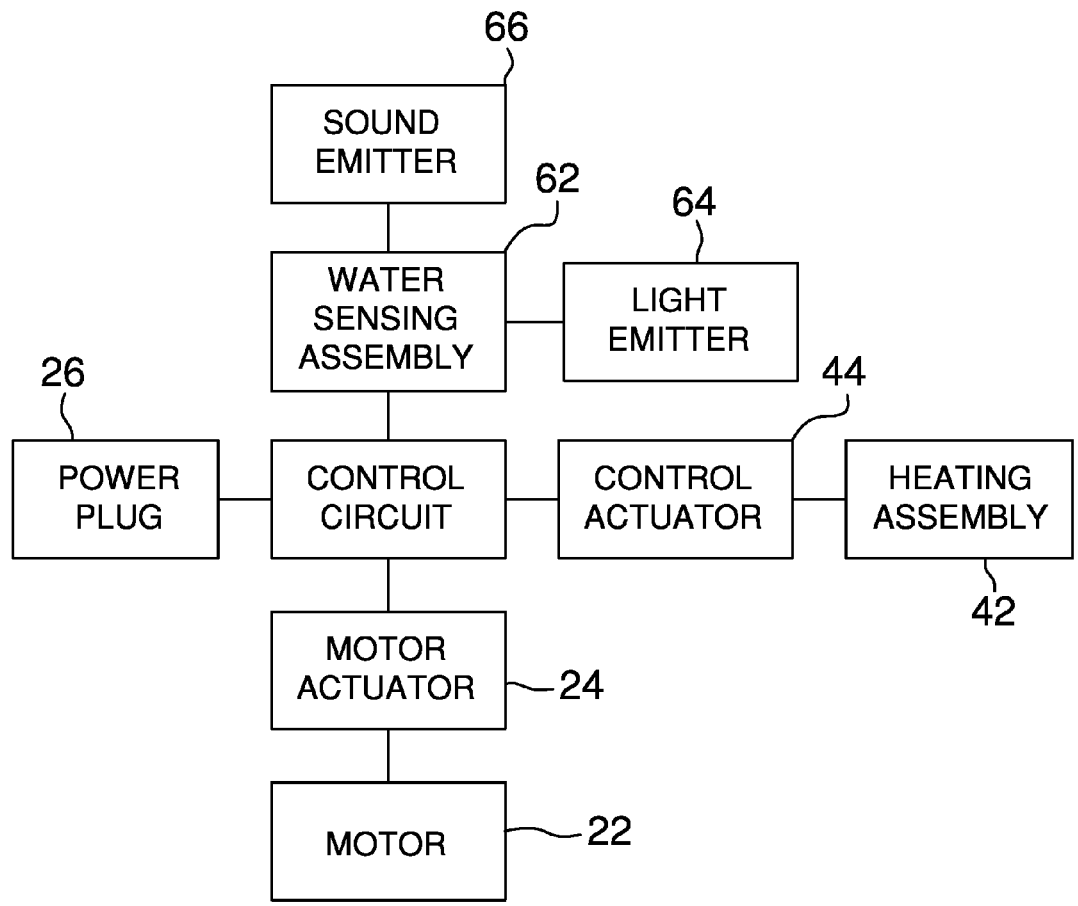
FIG. 7 is a schematic view of an embodiment of the disclosure.

With reference now to the drawings, and in particular to FIGS. 1 through 7 thereof, a new heated stand mixer device embodying the principles and concepts of an embodiment of the disclosure and generally designated by the reference numeral 10 will be described.

As best illustrated in FIGS. 1 through 7, the stand mixer and heating means combination apparatus 10 generally comprises a stand mixer 12 that has a base 14, a post 16 attached to and extending upwardly from the base 14, and a mixer housing 18 is pivotally coupled to the post 16 opposite the base 14. Mixing attachments 20 are attachable to the mixer housing 18 and rotated by the mixer housing 18 when the stand mixer 12 is turned on. The above stand mixer 12 is conventional in function and includes a motor 22 and motor control 24. The stand mixer 12 also includes a power cord 26 for supplying electrical power to the stand mixer 12. The power cord 26 may be a retracting cord. A top side 28 of the base 14 includes a container mating member 30.

An outer container 32 has an outer surface 34 that has a mixer mating member 36, which is releasably engageable with the container mating member 28. The mixer mating member 36 engages the container mating member 30 such that rotation of the mixing attachments 20 does not decouple the outer container 32 from the base 14. The outer container 32 includes a bottom wall 38 and a perimeter wall 40 that is attached to and extends upwardly from the bottom wall 38. The outer container 32 may be comprised of any conventional material used for cooking purposes and may further have measuring indicia thereon indicating volume increments within the outer container 32.

A heating assembly 42 is mounted on the top side 28 of the base 14 and is spaced from post 16 and below the mixer housing 18. The heating assembly 42 is in thermal communication with the outer container 32 when the mixer mating member 36 is engaged with the container mating member 30. The heating assembly 42 heats the outer container 32 when the heating assembly 42 is turned on. The heating assembly 42 may comprise any conventional heating means such as an electric heating element, hot plate, an induction heating assembly, and the like. The heating assembly 42 will likely extend above a plane of the top side 28 to allow the heating assembly 42 to be used as a conventional electric cook top for heating pots and pans for conventional cooking purposes. An actuator 44 is mounted on the stand mixer 12 and is electrically coupled to the heating assembly 42 to selectively turn the heating assembly on or off. The actuator 44 will include different temperature settings 46 and may further include a timer 48 to shut the heating assembly 42 off at a selected amounted of time. The heating assembly 42 will likely include a safety sensor to turn off the heating assembly should the heating assembly 42 become overly heated. The actuator 44 may further be in communication with the mixer motor 22 to cut power to the mixer motor 22 after a specified amount of time.

An inner container 50 has a lower wall 52 and a perimeter wall 54 that is attached to and extends upwardly from the lower wall 52. The inner container 50 has a size to be positioned in the outer container 32. The inner container 50 may also be comprised of any conventional cooking material and may again include measurement indicia therein to indicate an internal volume, at different levels, of the inner container 50. A handle 56 or grip may be attached to the inner container 50 and positioned adjacent to an upper edge of the perimeter wall 54. An outer container 36 handle 57 may be incorporated as well. Each of the outer 36 and inner 50 containers may also be equipped with removable lids, not shown.

A first mating member 58 is attached to an outer surface of the inner container 50 and a second mating member 60 is attached to an inner surface of the outer container 32. The first 58 and second 60 mating members are releasably engageable with each other to secure the outer 32 and inner 50 containers together while retaining the lower 52 and bottom 38 walls in a spaced relationship with each other. The first 58 and second 60 mating members are also configured to prevent the outer 32 and inner 50 containers from being dislodged from each other by the rotation of the mixing attachments 20. A space between the inner 50 and outer 32 containers is in communication with air outside of the outer container 32 when the inner 50 and outer 32 containers are attached together to allow release of steam. This allows the outer 32 and inner 50 containers to be used as a double boiler wherein water that is positioned between the outer 32 and inner 50 containers is heated when the outer container 32 is heated by the heating assembly 42. The water in turn heats the inner container 50 but in a controlled manner which prevents the burning of food contained within the inner container 50. Alternatively, the inner container 50 may also be perforated so that food within the inner container 50 may be steamed by the boiling of water in the outer container 32. In such an instance, the inner container 50 will have a lower wall 52 spaced at least 5 cm from the bottom wall 38 of the outer container 32. Finally, one type of food may be boiled in the outer container 32 while the inner container 50 is being used to cook a second type of food. Again, this would require sufficient space between the lower 52 and bottom 38 walls to accommodate food and water therebetween.

A water indicating assembly 62 is mounted on the stand mixer 12. The water indicating assembly 62 is configured to signal a person to verify water is positioned between the inner 50 and outer 32 containers when the inner 50 and outer 32 containers are being utilized as a double boiler. The water indicating assembly 62 may be configured in a variety of forms. One form may include a water timer. The water timer actuates an alarm after a predetermined amount of time has elapsed which corresponds to a typical amount of time passage at which point the water level becomes too low. The alarm may include a light emitter 64, an audible alarm sound utilizing a sound emitter 66 or a combination of both. In particular, water will be placed in the outer container 32 to a predetermined level which corresponds to the predetermined amount of time. When the alarm is actuated, the user of the apparatus 10 will understand that the water levels much be checked and refilled if necessary. Another form of water indicating assembly 62 may include a fluid probe embedded in the outer container 32 which electrically engages the stand mixer 12 when the mixer mating member 36 and the bowl mating member 30 engage each other. When the water level becomes too low to be detected by the probe, the alarm will be actuated. Yet another form may utilize the water for closing a circuit between the outer 32 and inner 50 bowls wherein lower water opens the circuit to actuate the alarm.

In use, the stand mixer 12 may be used in a conventional manner to mix food. However, when the food is to be heated, the heating assembly 42 is turned on to cook or heat the food while it is being mixed. The ability to use the outer 32 and inner 50 containers together, however, allows a person to cook what are typically labor intensive foods automatically. Preparations of certain foods such as custards, sauces, jams, risotto, confections and the like require frequent mixing over a prolonged period while heat is applied to the food. The apparatus 10 allows a person to simply add the ingredients and turn the apparatus 10 on so that it mixes the food while it is being heated. The use of a double boiler type apparatus will ensure that the food in the inner container 32 will be evenly and steadily heated. The actuator 44 may also be programmed with recipes for particular foods which not only controls the mixing motor 22 but which also controls and varies the amount of heat being used. This will allow a person to set the apparatus to make the pre-programmed recipe and return to the apparatus when it is finished.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A food preparation apparatus comprising:
   a stand mixer having a base, a post attached to and extending upwardly from said base, and a mixer housing being pivotally coupled to said post opposite said base, wherein mixing attachments are attachable to said mixer housing and rotated by said mixer housing when said stand mixer is turned on;
   a top side of said base including a container mating member;
   an outer container having an outer surface having a mixer mating member being releasably engageable with said container mating member, said outer container including a bottom wall and a perimeter wall being attached to and extending upwardly from said bottom wall;
   a heating assembly being mounted on said top side of said base and being spaced from post and below said mixer housing, said heating assembly being in thermal communication with said outer container when said mixer mating member is engaged with said container mating member;
   an inner container having a lower wall and a perimeter wall being attached to and extending upwardly from said lower wall, said inner container having a size to be positioned in said outer container; and
   a first mating member being attached to an outer surface of said inner container and a second mating member being attached to an inner surface of said outer container, said first and second mating members being releasably engageable with each other to secure said outer and inner containers together while retaining said lower and bottom walls in a spaced relationship with each other, said first and second mating members preventing rotation of said inner container in a first direction with respect to said outer container, said inner container being rotatable in a second direction with respect to said outer container to release said first mating member from said second mating member.

2. The apparatus according to claim 1, wherein said heating assembly heats said outer container when said heating assembly is turned on, an actuator being mounted on said stand mixer and being electrically coupled to said heating assembly to selectively turn said heating assembly on or off.

3. The apparatus according to claim 1, wherein a space between said inner and outer containers is in communication with air outside of said outer container when said inner and outer containers are attached together.

4. The apparatus according to claim 1, further including a water indicating assembly being mounted on said stand mixer, said water indicating assembly being configured to signal a person to verify water is positioned between said lower and bottom walls when said inner and outer containers are being utilized as a double boiler.

5. A food preparation apparatus comprising:
- a stand mixer having a base, a post attached to and extending upwardly from said base, and a mixer housing being pivotally coupled to said post opposite said base, wherein mixing attachments are attachable to said mixer housing and rotated by said mixer housing when said stand mixer is turned on;
- a top side of said base including a container mating member;
- an outer container having an outer surface having a mixer mating member being releasably engageable with said container mating member, said outer container including a bottom wall and a perimeter wall being attached to and extending upwardly from said bottom wall;
- a heating assembly being mounted on said top side of said base and being spaced from post and below said mixer housing, said heating assembly being in thermal communication with said outer container when said mixer mating member is engaged with said container mating member, said heating assembly heating said outer container when said heating assembly is turned on;
- an actuator being mounted on said stand mixer and being electrically coupled to said heating assembly to selectively turn said heating assembly on or off;
- an inner container having a lower wall and a perimeter wall being attached to and extending upwardly from said lower wall, said inner container having a size to be positioned in said outer container;
- a first mating member being attached to an outer surface of said inner container and a second mating member being attached to an inner surface of said outer container, said first and second mating members being releasably engageable with each other to secure said outer and inner containers together while retaining said lower and bottom walls in a spaced relationship with each other, a space between said inner and outer containers being in communication with air outside of said outer container when said inner and outer containers are attached together, said first and second mating members preventing rotation of said inner container in a first direction with respect to said outer container, said inner container being rotatable in a second direction with respect to said outer container to release said first mating member from said second mating member; and
- a water indicating assembly being mounted on said stand mixer, said water indicating assembly being configured to signal a person to verify water is positioned between said lower and bottom walls when said inner and outer containers are being utilized as a double boiler.

* * * * *